(12) United States Patent
Zheng (10) Patent No.: US 11,927,326 B1
(45) Date of Patent: Mar. 12, 2024

(54) NIGHT LIGHT

(71) Applicant: Chubin Zheng, Shantou (CN)

(72) Inventor: Chubin Zheng, Shantou (CN)

(73) Assignee: Chubin Zheng, Shantou (CN)

( * ) Notice: Subject to any disclaimer, the term of this patent is extended or adjusted under 35 U.S.C. 154(b) by 0 days.

(21) Appl. No.: 18/361,656

(22) Filed: Jul. 28, 2023

(51) Int. Cl.
*F21V 21/002* (2006.01)
*A01M 29/18* (2011.01)
*F21Y 115/10* (2016.01)

(52) U.S. Cl.
CPC .......... *F21V 21/002* (2013.01); *A01M 29/18* (2013.01); *F21Y 2115/10* (2016.08)

(58) Field of Classification Search
CPC ............ A01M 29/16–22; F21V 21/002; F21Y 2115/10
See application file for complete search history.

(56) References Cited

FOREIGN PATENT DOCUMENTS

| CN | 107241828 A | 10/2017 |
|----|-------------|---------|
| CN | 107896410 A | 4/2018 |
| CN | 209893272 U | 1/2020 |
| CN | 214229611 U * | 9/2021 |

* cited by examiner

*Primary Examiner* — Jason M Han
(74) *Attorney, Agent, or Firm* — Nitin Kaushik (57) ABSTRACT

The present invention discloses a night light, in relation to the field of pest repellent night lights, comprising a mosquito repellent lamp housing and a PCB (printed circuit board) built in the mosquito repellent lamp housing; wherein one end face of the PCB is further electrically mounted with an electrical plug, and the end of the electrical plug protrudes out of the mosquito repellent lamp housing; one end of the PCB away from the electrical plug is further electrically mounted with a tact switch; an end face of the PCB is further electrically mounted with a miniature ultrasonic module; a surface of the PCB away from the electrical plug is fixedly mounted with several LED lamp beads.

16 Claims, 9 Drawing Sheets

NIGHT LIGHT

TECHNICAL FIELD

The present invention relates to the field of pest repellent night lights, specifically a night light.

BACKGROUND

Pest repellent night lights repel mosquitoes and flying ants to avoid mosquito bites, etc. Especially after spring, there are more and more mosquitoes. In order to ensure good sleep quality, mosquito repellent lamps are used indoors.

Most of the existing mosquito repellent lamps are provided with a built-in small fan, and then use a low-temperature electric heating structure to volatilize mosquito repellent liquid. The small fan is configured to quickly diffuse the volatilized gas in the indoor air, thereby playing a role in repelling mosquitoes and flying ants. In the process of using this type of mosquito repellent lamps, there is still a disadvantage, that is, many users of these mosquito repellent lamps may not timely notice a serious shortage of mosquito repellent liquid due to its fast volatilization, so that mosquito repellent lamps soon lose effects in repelling mosquitoes and other pests, and users suffer from mosquito bites again. In this regard, we propose a night light.

SUMMARY

The purpose of the present invention is to provide a night light, so as to solve the problem as raised in the above-mentioned background.

For the above-mentioned purpose, the present invention provides a technical solution as follows: a night light, comprising a mosquito repellent lamp housing and a PCB (printed circuit board) built in said mosquito repellent lamp housing; wherein an end face of said PCB is further electrically mounted with a miniature ultrasonic module; several LED lamp beads are fixedly mounted on a surface of said PCB, and said LED lamp beads and said miniature ultrasonic module are mounted on the same side of said PCB. The miniature ultrasonic module emits low-frequency sound waves that play a role in repelling surrounding mosquitoes and pests, including hearing pests, driving them out of the protected area.

Preferably, one end face of said PCB is electrically provided with an electrical plug, and the end of said electrical plug protrudes out of said mosquito repellent lamp housing; one end of said PCB away from said electrical plug is further electrically mounted with a tact switch; one end face of said mosquito repellent lamp housing away from said electrical plug is fixedly mounted with a lampshade cover plate made of a frosted plastic material, which diffuses the light emitted by LED lamp beads and through which the light turns soft and gentle.

Preferably, one side of said PCB away from said miniature ultrasonic module is fixedly provided with a buzzer, the outer side of said buzzer is further provided with a negative ion generator, and both said buzzer and said negative ion generator are electrically welded with said PCB. After it is started, the negative ion generator purifies the air around the device, and the buzzer is configured to repel mice indoors in cooperation with the miniature ultrasonic module.

Preferably, said mosquito repellent lamp housing comprises assembled assembly block I and assembly block II. The assembled configuration of the mosquito repellent lamp housing facilitates the later maintenance and replacement of components inside the housing. The electrical end of said electrical plug is slidable through said assembly block I; said lampshade cover plate is positioned on one end face of said assembly block II away from said assembly block I; one end of said assembly block II near said assembly block I is fixedly mounted with two props II, and one end of said assembly block I near said assembly block II is fixedly provided with two props I corresponding to said props II; two positioning holes are opened inside said PCB, and said props II are inserted into said positioning holes; a bolt assembly component is provided between said assembly block I and said assembly block II of each set, and an elastic extension component is provided between said electrical plug and said PCB.

Preferably, said elastic extension component comprises an electrical connection block seat, which is electrically welded and mounted on one end face of said PCB away from said lampshade cover plate and the interior of which is slidably engaged with an actuation link; one end of said actuation link away from said electrical connection block seat is fixedly connected to said electrical plug, and said electrical plug is connected to said electrical connection block seat via a conductive wire; spring I is fixedly mounted between one end of said actuation link away from said electrical plug and said electrical connection block seat, that is, the electrical connection between the electrical plug and the PCB is elastic.

Preferably, said bolt assembly component comprises a brake post that is slidably inserted in said props I, the middle section of said brake post provided with an annular groove portion, and one end of said brake post near said props II provided with a threading portion, wherein said threading portion is threadedly engaged with the port of said props II; a rotating member is provided between said annular groove portion and said props I, and an braking member is provided between said rotating member and said actuation link, and threadedly engaged with the port of props II through the threading portion; and a sleeve rod is slidably engaged with props I so that assembly block I and assembly block II are tightly immobilized when props I rotates.

Preferably, said rotating member comprises a sleeve rod axially slidably engaged with the outer wall of said props I, said sleeve rod perpendicular to said props I; one end of said sleeve rod is rotatably socketed inside said annular groove portion and the other end of said sleeve rod is threadedly engaged with a threaded column; one end of said threaded column away from said assembly block II is rotatably engaged with the interior of said assembly block I. Because the threaded column is rotatably engaged with the interior of assembly block I, when moving up and down the sleeve rod causes the threaded column to rotate.

Preferably, said braking member comprises a gear fixedly engaged with the outer surface of said threaded column, the outer side of said gear is mounted with a gear rack, one end of said gear rack near said actuation link is provided with an optical axis, and one end of said optical axis near said actuation link is fixedly mounted with a brake block; the outer surface of said actuation link is provided with several transverse grooves that are evenly spaced and arranged in a straight line; and one end of said brake block near said actuation link is fixedly mounted with several brake teeth engaged with said transverse grooves. The rotation of the gear can drive the gear rack to move, causing the brake teeth to engage with the transverse grooves.

Preferably, said optical axis is slidably inserted in said gear rack, and one end of said optical axis away from said brake block is fixedly mounted with a slider slidably arranged inside said gear rack, and one end of said slider away from said optical axis is provided with spring II. If the optical axis is slidably inserted inside the gear rack, the brake teeth can be elastically engaged with the transverse grooves by the action of spring II, and the pressure applied on spring II allows the brake teeth to engage with the transverse grooves more tightly.

Preferably, one end face of said gear rack away from said brake teeth is slidably mounted with a positioning rod, and both ends of said positioning rod are fixedly connected to said assembly block I. The positioning rod plays a role of limiting the horizontal sliding of the gear rack.

Preferably, the width of said sleeve rod is smaller than the inner ring diameter of said props I, for preventing the sleeve rod from being stuck inside props I.

Preferably, said gear and one end face of said gear rack away from said assembly block II are slidably engaged on the inner wall of said assembly block I, so that the gear and the gear rack are engaged on the inner wall of assembly block I, further guaranteeing the stable sliding of the gear rack.

Preferably, the outer wall of said actuation link is provided with at least one straight groove, and said electrical connection block seat is slidably engaged with said straight groove. By the effect of straight groove, it is ensured that the actuation link is axially slidable rather than horizontally rotates.

Preferably, one end face of said assembly block I away from said assembly block II is provided with several thermal vias which facilitate the effective heat dissipation of electronic components inside the mosquito repellent lamp housing.

Preferably, said actuation link and said electrical connection block seat are both made of hard insulating materials. In order to avoid short circuit of the PCB caused by the actuation link and the electrical connection block seat, the two parts are configured to comprise insulating materials.

Preferably, one end of said brake post away from the threading portion is provided with a hexagonal socket. The hexagonal socket is configured to facilitate engagement with a hexagonal wrench.

Preferably, one end of said mosquito repellent lamp housing away from said electrical plug is fixedly mounted with a blank-off plate, the center of which is provided with a press plate for actuating said tact switch; and the outer wall of said mosquito repellent lamp housing is inserted with a photosensitive module, which is electrically welded with said PCB and automatically starts LED lamp beads depending on the brightness level of the environment where it is located.

Compared to the prior art, the present invention has the following beneficial effects:

1. By configuring a miniature ultrasonic module and a buzzer in the interior of a mosquito repellent lamp housing, the present invention can effectively drive away mosquitoes and mice indoors at the same time under the simultaneous performance of the miniature ultrasonic module and the buzzer when the device is running. And there is no need to worry about the problem of running out of mosquito repellent liquid, as in the existing mosquito repellent devices;
2. By configuring a photosensitive module, the present invention can automatically start the device according to the photosensitivity; and
3. By the action of LED lamp beads and a lampshade cover plate, the present invention can make the device emit soft light during operation, and the soft light plays a certain lighting effect for users.

In this figures, 1. mosquito repellent lamp housing; 2. PCB; 3. tact switch; 4. electrical plug; 5. miniature ultrasonic module; 6. buzzer; 7. negative ion generator; 8. photosensitive module; 9. blank-off plate; 10. press plate; 11. LED lamp beads; 12. lampshade cover plate; 13. assembly block I; 14. assembly block II; 15. bolt assembly component; 16. elastic extension component; 17. braking member; 18. rotating member; 19. electrical connection block seat; 20. actuation link; 21. spring I; 22. prop I; 23. prop II; 24. brake post; 25. threading portion; 26. annular groove portion; 27. hexagonal socket; 28. sleeve rod; 29. threaded column; 30. gear; 31. gear rack; 32. positioning rod; 33. optical axis; 34. slider; 35. spring II; 36. brake block; 37. brake teeth; 38. transverse grooves; 39. straight grooves; 40. positioning holes; 41. thermal vias.

DETAILED DESCRIPTION OF THE EMBODIMENTS

The following clearly and completely describes the technical solutions in the examples of the present invention with reference to the accompanying drawings in the examples of the present invention. Apparently, the described examples are a part rather than all of the embodiments of the present invention. All other examples obtained by persons of ordinary skill in the art based on the examples of the present invention without inventive efforts shall fall within the protection scope of the present invention.

Example 1

Referring to FIG. 1-FIG. 4, a night light as shown therein comprises a mosquito repellent lamp housing 1 and a PCB 2 built in the mosquito repellent lamp housing 1; wherein an end face of the PCB 2 is further electrically mounted with a miniature ultrasonic module 5; a surface of the PCB 2 is fixedly mounted with several LED lamp beads 11, and the LED lamp beads 11 and the miniature ultrasonic module 5 are mounted on the same side of the PCB 2. The miniature ultrasonic module 5 emits low-frequency sound waves that play a role in repelling surrounding mosquitoes and other hearing pests, driving them out of the protected area.

Figure 2:
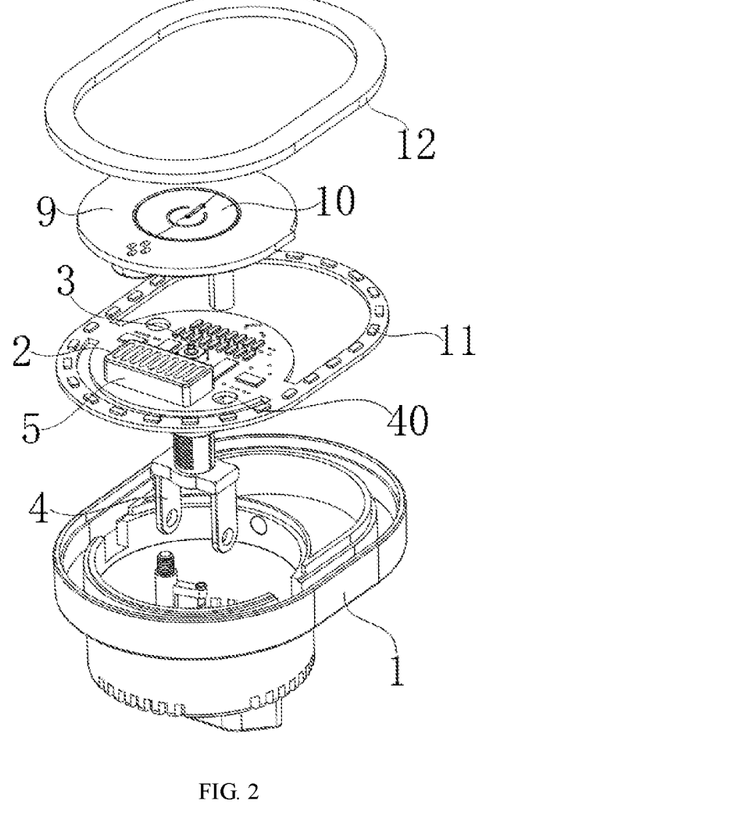
FIG. 2 is an exploded view of the overall structure of Example 1 of the present invention.
Figure 3:
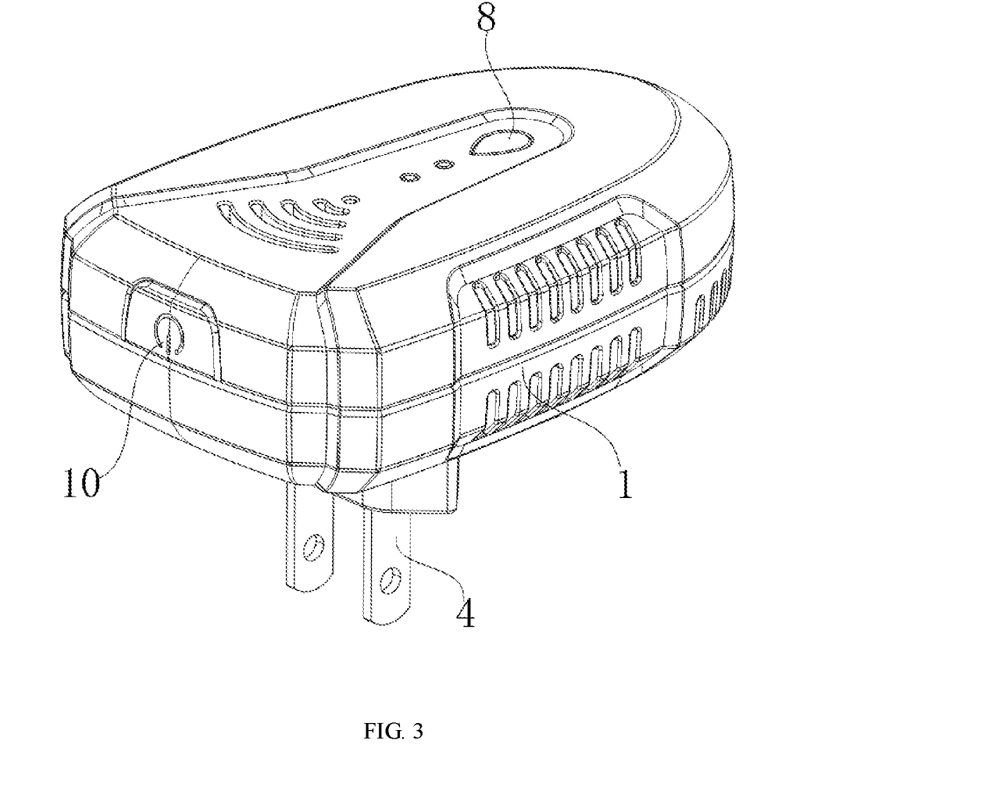
FIG. 3 is another schematic view of the overall appearance of Example 1 of the present invention.
Figure 4:
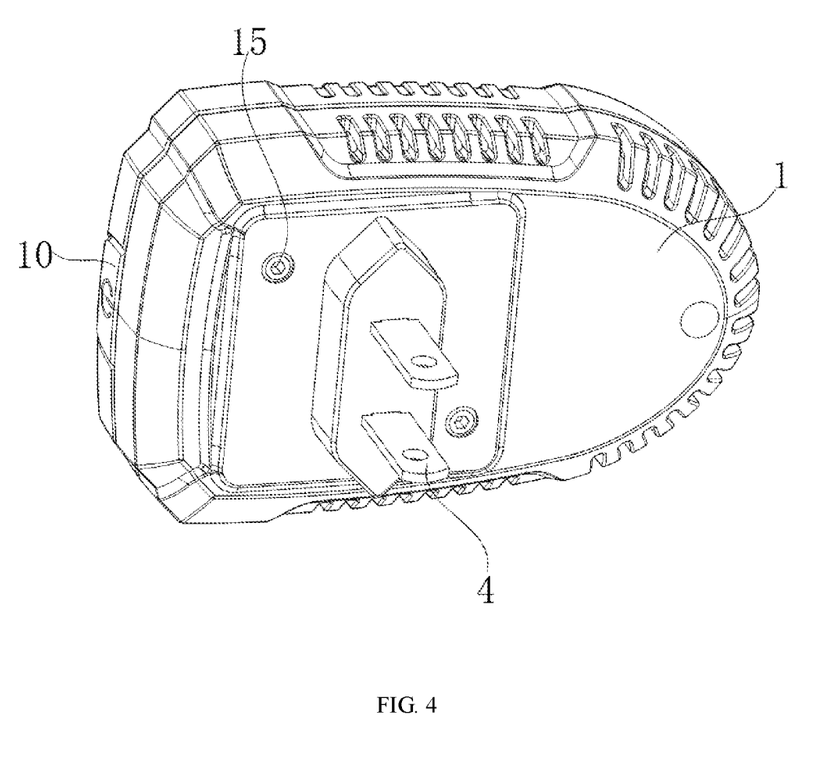
FIG. 4 is another schematic view of the overall appearance of Example 1 of the present invention showing the position of bolt assembly component.

Referring to FIG. 2, one end face of the PCB 2 as shown therein is electrically provided with an electrical plug 4, and the end of the electrical plug 4 protrudes out of the mosquito repellent lamp housing 1; one end of the PCB 2 away from the electrical plug 4 is further electrically mounted with a tact switch 3; and one end face of the mosquito repellent lamp housing 1 away from the electrical plug 4 is fixedly mounted with a lampshade cover plate 12 made of a frosted plastic material, which diffuses the light emitted by the LED lamp beads 11 and through which the light turns soft and gentle.

Figure 5:
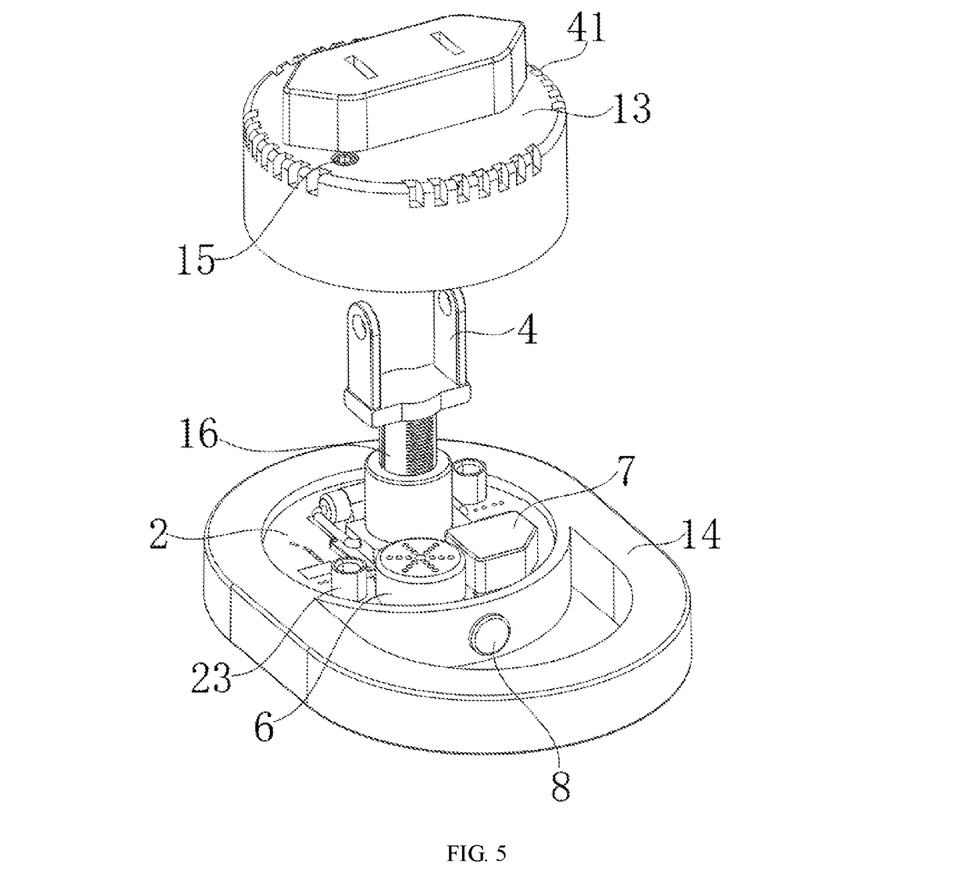
FIG. 5 is an exploded view of the structures of buzzer and negative ion generator in Example 1 of the present invention.

Referring to FIG. 5, one side of the PCB 2 as shown therein away from the miniature ultrasonic module 5 is fixedly provided with a buzzer 6, the outer side of the buzzer 6 is further provided with a negative ion generator 7, and both the buzzer 6 and the negative ion generator 7 are electrically welded with the PCB 2. After it is started, the negative ion generator 7 purifies the air around the device; and the buzzer 6 is configured to repel mice indoors in cooperation with the miniature ultrasonic module 5.

Figure 1:
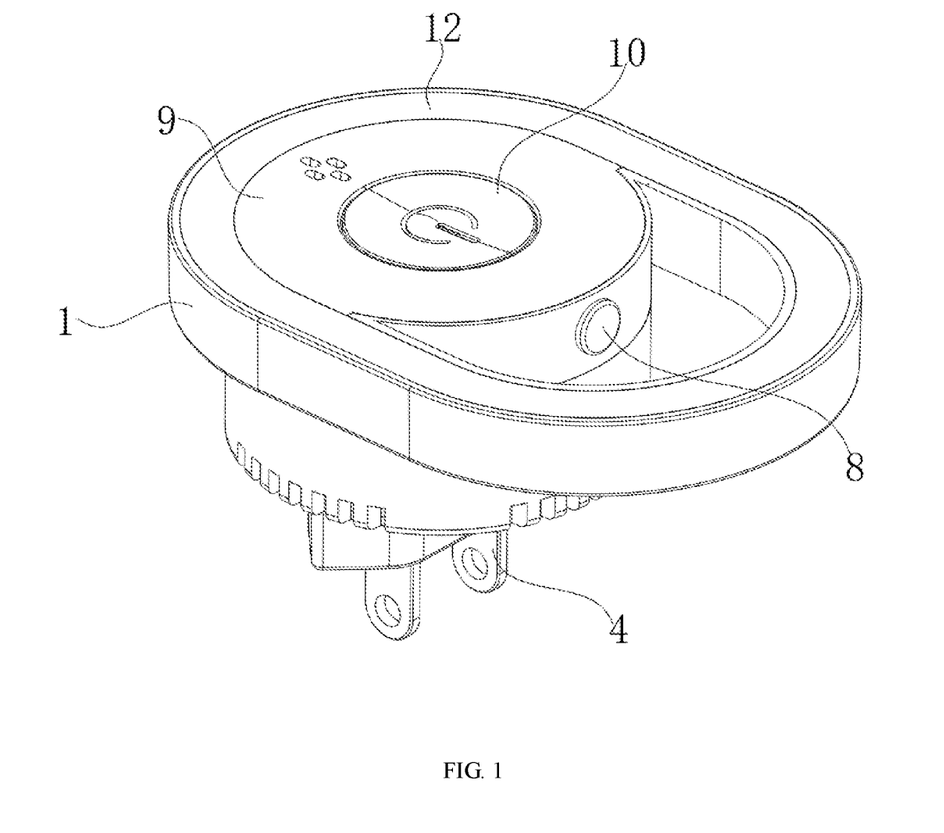
FIG. 1 is a schematic view of the overall structure of Example 1 of the present invention.

Referring to FIG. 1 and FIG. 2, one end of the mosquito repellent lamp housing 1 away from the electrical plug 4 as shown therein is fixedly mounted with a blank-off plate 9, and the center of the blank-off plate 9 is provided with a press plate 10 for actuating the tact switch 3; the outer wall of the mosquito repellent lamp housing 1 is inserted with a photosensitive module 8, and the photosensitive module 8 and the PCB 2 are electrically welded. The photosensitive module 8 can automatically starts the LED lamp beads 11 according to the brightness level of the environment where it is located.

Working principle: During the use of the night light of the present solution, insert the electrical plug 4 into a socket (not shown) thereby powering the night light, and then press the tact switch 3 through the press plate 10 to start the device, wherein the touch switch 3 has four positions: one is OFF position, and the other three are ON positions;

ON position 1: start the buzzer 6 and the miniature ultrasonic module 5, which can repel mosquitoes and mice indoors at the same time;
  ON position 2: start the buzzer 6; in the case of no mosquitoes, start the buzzer 6 alone, which drives away small animals such as mice within a preset range;
  ON position 3: start the miniature ultrasonic module 5 alone, which drives away mosquitoes within a preset range.

When the night light of this solution is running, the negative ion generator 7 also runs synchronously and releases negative ions to settle dust particles floating in the surrounding air. In other words, the negative ion generator 7 plays a certain role in cleaning the surrounding air.

It is worth noting that the photosensitive module 8 is configured to play a certain role in lighting the use environment depending on the intensity of light indoors. When the indoor light is so weak that the room is in a dark state, the photosensitive module 8 starts the LED lamp beads 11, and the light generated by the LED lamp beads 11 turns soft after passing through the lampshade cover plate 12.

It is worth noting that the model of the miniature ultrasonic module 5 used in this solution is KS103-485. After the miniature ultrasonic module 5 is started, it emits ultrasonic waves with the night light as the center for driving away small animals like mosquitoes or mice, thereby playing a role in repelling hearing pests out of the protection range;

The model of the photosensitive module 8 is XH-M131. Depending on brightness in the environment where the night light is located, the LED lamp beads 11 can be automatically started by the photosensitive module 8.

Example 2

Figure 6:
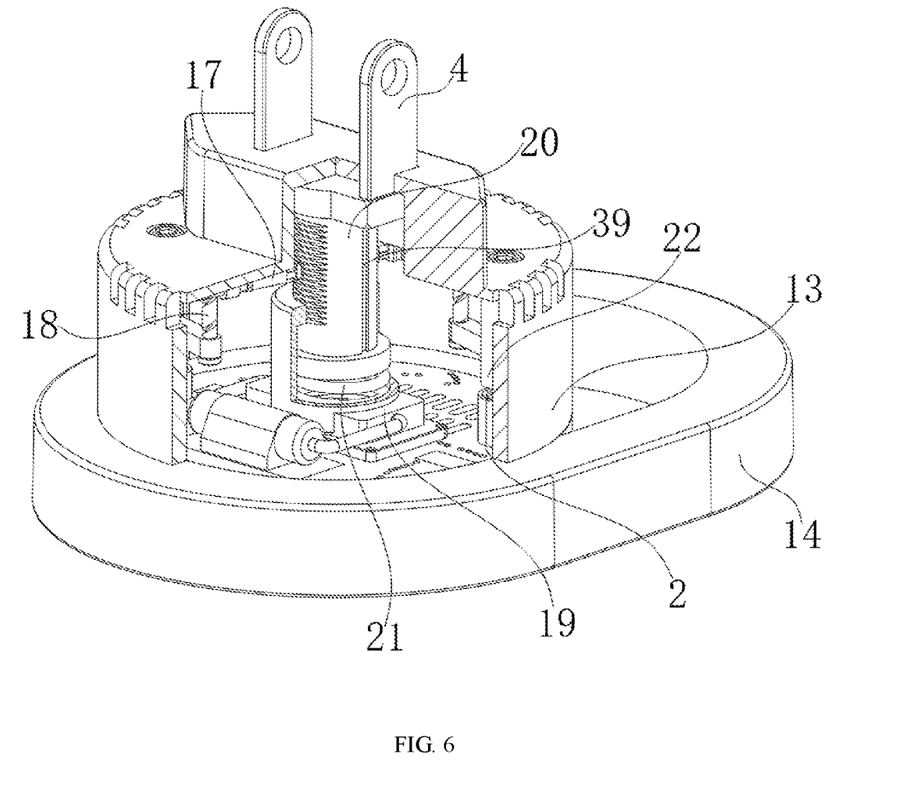
FIG. 6 is a cross-sectional view of the structures of braking member and rotating member in Example 2 of the present invention.

Referring to FIG. 5 and FIG. 6, this embodiment provides further explanation for Example 1. The mosquito repellent lamp housing 1 comprises assembled assembly block I and assembly block I. The assembled configuration of the mosquito repellent lamp housing 1 facilitates the later maintenance and replacement of components inside the housing. The electrical end of the electrical plug 4 is slidable through said assembly block I-13. The lampshade cover plate 12 is positioned on one end face of the assembly block II-14 away from the assembly block I-13. One end of the assembly block II-14 near the assembly block I-13 is fixedly mounted with two props II-23, and one end of the assembly block I-13 near the assembly block II-14 is fixedly provided with two props I-22 corresponding to the props II-23. Two positioning holes 40 are opened in the PCB 2, and the props II-23 are inserted into the positioning holes 40. A bolt assembly component 15 is provided between the assembly block I-13 and the assembly block II-14 of each set, and an elastic extension component 16 is provided between the electrical plug 4 and the PCB 2.

Figure 7:
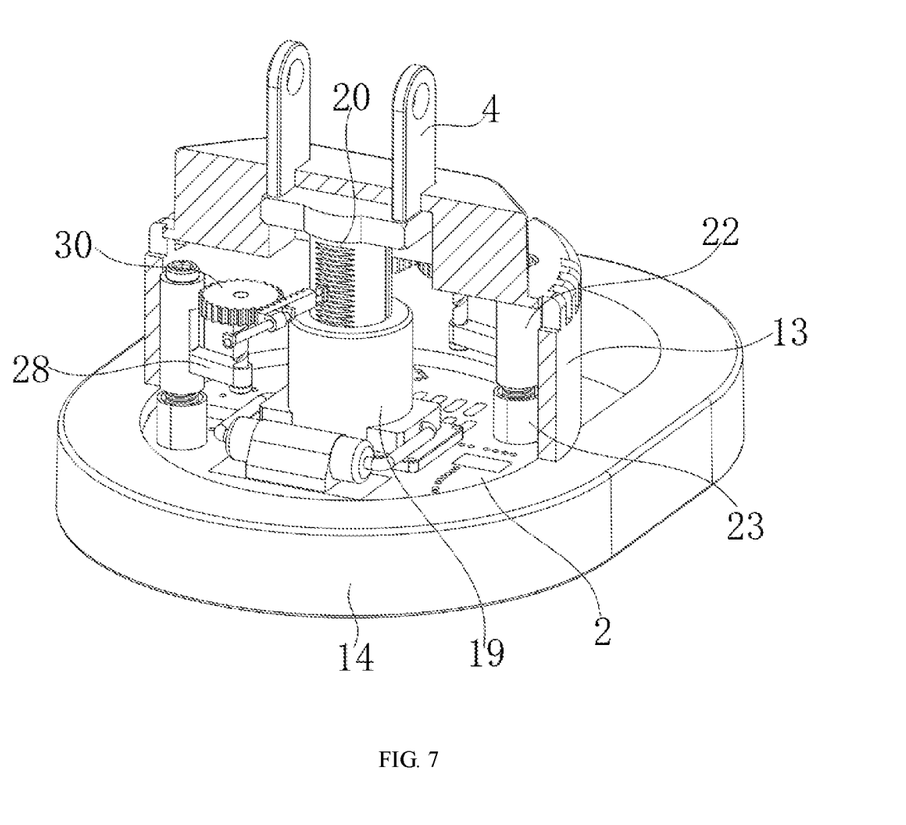
FIG. 7 is a cross-sectional view of the position and structure of props I and props II in Example 2 of the present invention.

Referring to FIG. 7, the elastic extension component 16 as shown therein comprises an electrical connection block seat 19, which is electrically welded and mounted on one end face of the PCB 2 away from the lampshade cover plate 12 and the interior of which is slidably inserted with an actuation link 20; one end of the actuation link 20 away from the electrical connection block seat 19 is fixedly connected to the electrical plug 4, and the electrical plug 4 is connected to the electrical connection block seat 19 via a conductive wire; spring I-21 is fixedly mounted between one end of the actuation link 20 away from the electrical plug 4 and the electrical connection block seat 19, that is, the electrical connection between the electrical plug 4 and the PCB 2 is elastic.

Figure 8:
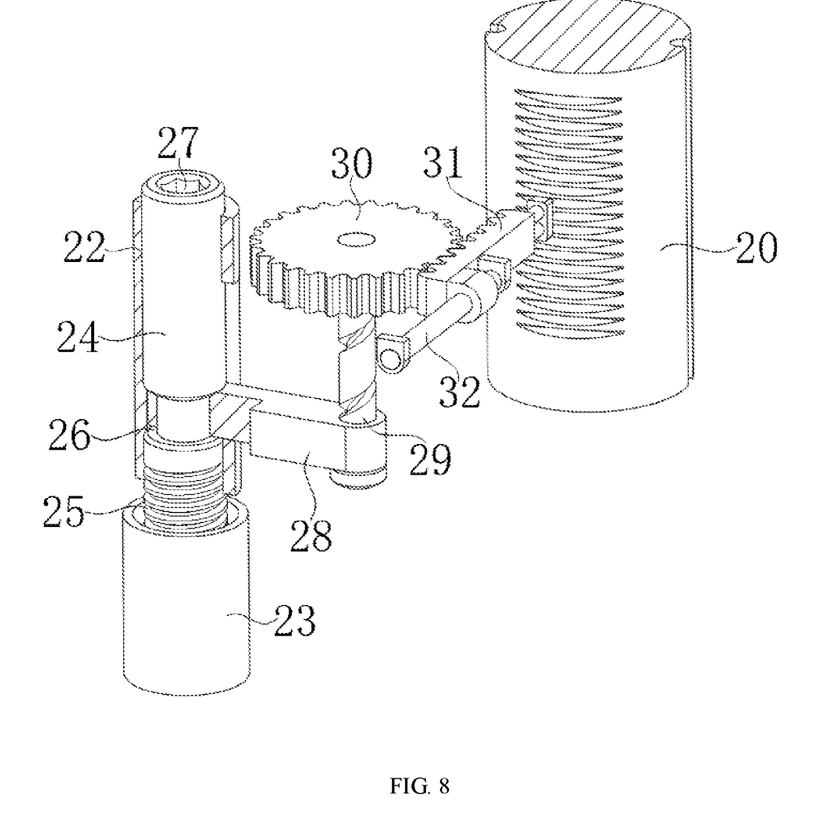
FIG. 8 is a cross-sectional view of the internal structure of props I in Example 2 of the present invention.

Referring to FIG. 8, the bolt assembly component 15 as shown therein comprises a brake post 24 slidably inserted in the props I-22, the middle section of the brake post 24 provided with an annular groove portion 26, and one end of the brake post 24 near the props II-23 provided with a threading portion 25, which is threadedly engaged with the port of the props II-23; a rotating member 18 is provided between the annular groove portion 26 and the props II-22, and an braking member 17 is provided between the rotating member 18 and the actuation link 20, and threadedly engaged with the port of the props II-23 through the threading portion 25; and a sleeve rod 28 is slidably engaged with props I-22 so that assembly block I-13 and assembly block II-14 are tightly immobilized during the rotation of props I-22.

Figure 9:
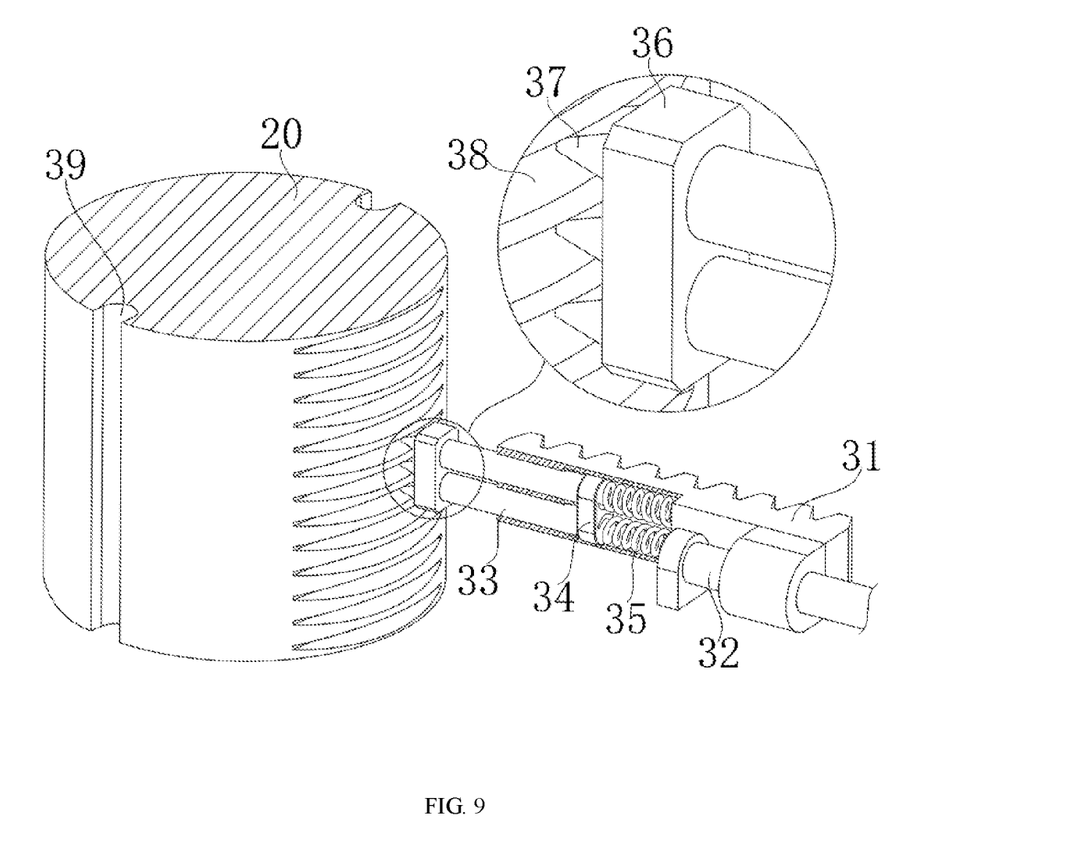
FIG. 9 is a cross-sectional view of the internal structure of gear rack in Example 2 of the present invention.

Referring to FIG. 8 and FIG. 9, the rotating member 18 as shown therein comprises a sleeve rod 28 axially slidably engaged with the outer wall of the props I-22, the sleeve rod 28 perpendicular to the props I-22; one end of the sleeve rod 28 is rotatably socketed inside the annular groove portion 26 and the other end of the sleeve rod 28 is threadedly engaged with a threaded column 29, wherein one end of the threaded column 29 away from the assembly block II-14 is rotatably engaged with the interior of the assembly block I-13. Because the threaded column 29 is rotatably engaged with the interior of the assembly block I-13, when moving up and down the sleeve rod 28 allows the threaded column 29 to rotate.

Referring to FIG. 9, the braking member 17 as shown therein comprises a gear 30 fixedly engaged with the outer surface of the threaded column 29, the outer side of the gear 30 is engaged with a gear rack 31, one end of the gear rack 31 near the actuation link 20 is provided with an optical axis 33, and one end of the optical axis 33 near the actuation link 20 is fixedly mounted with a brake block 36; the outer surface of the actuation link 20 is provided with several transverse grooves 38 that are evenly spaced and arranged in a straight line; and one end of the brake block 36 near the actuation link 20 is fixedly mounted with several brake teeth 37 engaged with the transverse grooves 38. The rotation of the gear 30 can drive the gear rack 31 to move, causing the brake teeth 37 to engage with the transverse grooves 38.

Referring to FIG. 9, the optical axis 33 as shown therein is slidably inserted into the gear rack 31, and one end of the optical axis 33 away from the brake block 36 is fixedly mounted with a slider 34 slidably arranged inside the gear rack 31, and one end of the slider 34 away from the optical axis 33 is provided with a spring II-35. If the optical axis 33 is slidably inserted into the gear rack 31, the brake teeth 37 can be elastically engaged with the transverse grooves 38 by the action of the spring II-35, and the pressure applied on the spring II-35 allows the brake teeth 37 to engage with the transverse grooves 38 more tightly.

Referring to FIG. 8 and FIG. 9, one end face of the gear rack 31 away from the brake teeth as shown therein is slidably mounted with a positioning rod 32, wherein both ends of the positioning rod 32 are fixedly connected to the assembly block I-13. The positioning rod 32 plays a role of limiting the horizontal sliding of the gear rack 31.

Referring to FIG. 8, the width of the sleeve rod 28 is smaller than the inner ring diameter of the props I-22 as shown therein, for preventing the sleeve rod 28 from being stuck inside the props I-22.

Referring to FIG. 9, the gear 30 and one end face of the gear rack 31 away from the assembly block II-14 as shown therein are slidably engaged on the inner wall of the assembly block I-13, so that the gear 30 and the gear rack 31 are engaged on the inner wall of assembly block I-13, further guaranteeing the stable sliding of the gear rack 31.

Referring to FIG. 9, the outer wall of the actuation link 20 as shown therein is provided with at least one straight groove 39, and the electrical connection block seat 19 is slidably engaged with the straight groove 39. By the effect of the straight groove 39, it is ensured that the actuation link 20 is axially slidable rather than horizontally rotates.

Referring to FIG. 5, one end face of the assembly block I-13 away from the assembly block II-14 as shown therein is provided with several thermal vias 41 on the outer periphery, which facilitate the effective heat dissipation of electronic components (e.g., capacitors, resistors, diodes, etc.) inside the mosquito repellent lamp housing 1.

Referring to FIG. 6, the actuation link 20 and the electrical connection block seat 19 as shown therein are both made of hard insulating materials. In order to avoid short circuit of the PCB 2 caused by the actuation link 20 and the electrical connection block seat 19, the two parts are configured to comprise insulating materials.

Referring to FIG. 8, one end of the brake column 24 away from the threading portion 25 as shown therein is provided with a hexagonal socket 27, which is configured to facilitate engagement with a hexagonal wrench.

In this example: the mosquito repellent lamp housing 1 composed of the assembly block I-13 and the assembly block II-14 facilitates the later maintenance and replacement of electronic components inside the device. And the assembly process is also very convenient. Users only need to engage the positioning holes 40 in the PCB 2 with the props II-23. During the engagement process, it should be noted that the side of the PCB 2 provided with the LED lamp beads 11 faces the lampshade cover plate 12. After the PCB 2 has been placed, the assembly block I-13 is covered on the upper part of the assembly block II-14; wherein, during the covering process, the props I-22 are aligned with the props II-23, and the conductive end of the electrical plug 4 is also allowed to penetrate through the assembly block I-13.

In the application, it is considered that when the electrical plug 4 is mated with the socket, in order to ensure the stability of the socket with the electrical plug 4 during the plugging process, elastic clips built in the socket will clamp the plugged electrical plug 4, that is, in the plugging process the electrical plug 4 will encounter resistance, such that the PCB 2 will be deformed under pressure based on the presence of the reaction force. Therefore, in an attempt to avoid the reaction force from being directly applied on the PCB 2 when the electrical plug 4 is plugged into the socket, thereby preventing damages to some electronic components caused by deformation and bending of the PCB 2 under stress, in this solution the present application makes the following arrangements: the electrical plug 4 with elastic electrical connection is configured to, after the assembly block I-13 and the assembly block II-14 are tightly engaged, abut tightly against the inner wall of the assembly block I-13 under the action of the spring I-21. By engaging a hexagonal wrench with the hexagonal socket 27, the props I-22 is rotated. By threadedly engaging the threading portion 25 with the prop II-23, the brake post 24 is enabled to move in the direction of the props II-23. During the movement, the annular groove portion 26 causes the sleeve rod 28 to move simultaneously. When the sleeve rod 28 moves to a position where it cannot move any more, the prop I-22 and the prop II-23 of the same set are threadedly locked. Then the other brake post 24 rotates so that the prop I-22 and the prop II-23 of the other set are threadedly locked, too. At this moment, the assembly block I-13 and the assembly block II-14 are immobilized.

It is worth noting that during the sliding process the sleeve rod 28 causes the threaded column 29 to rotate with the gear 30, and the rotation of the gear 30 drives the gear rack 31 to slide in the direction of the actuation link 20. At this time, the brake block 36 at the end of the optical axis 33 abuts against the outer wall of the actuation link 20, and in the meanwhile the brake teeth 37 are also engaged with the transverse grooves 38. When the gear 30 continues to rotate, the continuous sliding of the gear rack 31 compresses the spring II-35; the elastic force produced by the spring II-35 acts on the slider 34, so that the brake teeth 37 are tightly engaged with the transverse grooves 38 under the action of the elastic force, thereby playing a role in braking the actuation link 20. At this time, when a user plugs the electrical plug 4 into the socket again, because the brake teeth 37 limit the actuation link 20 through the transverse grooves 38, the reaction force generated upon plugging will be applied on the PCB 2 via the actuation link 20, thereby playing a certain role in protecting the PCB 2.

It should be noted that relational terms herein, such as first and second, are only used to distinguish one entity or action from another entity or action, and do not necessarily require or imply any actual relationship or order between such entities or actions. Also, the terms "comprises," "comprising," or any other variation thereof, are intended to cover a non-exclusive inclusion, such that a process, method, article, or apparatus that comprises a list of elements is not necessarily limited to only those elements but may include other elements not expressly listed or inherent to such process, method, article, or apparatus.

Although the examples of the present invention have been shown and described, for those skilled in the art it will be understood that various changes, modifications, substitutions and variations can be made to these examples without departing from the principle and spirit of the present invention. The scope of the present invention will be defined by the appended claims and equivalents thereto.

What is claimed is:

1. A night light,
comprising a mosquito repellent lamp housing and a printed circuit board (PCB) built in said mosquito repellent lamp housing, wherein an end face of said PCB is further electrically mounted with a miniature ultrasonic module; a surface of said PCB is fixedly mounted with several LED lamp beads, and said LED lamp beads and said miniature ultrasonic module are mounted on the same side of said PCB,
wherein one side of said PCB away from said miniature ultrasonic module is fixedly provided with a buzzer, the outer side of said buzzer is further provided with a negative ion generator, and both said buzzer and said negative ion generator are electrically welded with said PCB.

2. The night light according to claim 1, characterized in that one end face of said PCB is electrically provided with an electrical plug, and an end of said electrical plug protrudes out of said mosquito repellent lamp housing; one end of said PCB away from said electrical plug is further electrically mounted with a tact switch; one end face of said mosquito repellent lamp housing away from said electrical plug is fixedly mounted with a lampshade cover plate, and said lampshade cover plate is made of a frosted plastic material.

3. The night light according to claim 2, characterized in that said mosquito repellent lamp housing comprises assembled assembly block I and assembly block II; the electrical end of said electrical plug is slidable through said assembly block I; said lampshade cover plate is positioned on an end face of said assembly block II away from said assembly block I; one end of said assembly block II near said assembly block I is fixedly mounted with two props II, and one end of said assembly block I near said assembly block II is fixedly provided with two props I corresponding to said props II; two positioning holes are opened in said PCB, and said props II are inserted into said positioning holes; a bolt assembly component is provided between said assembly block I and said assembly block II of each set, and an elastic extension component is provided between said electrical plug and said PCB.

4. The night light according to claim 3, characterized in that said elastic extension component comprises an electrical connection block seat electrically welded and mounted on one end face of said PCB away from said lampshade cover plate, wherein the interior of said electrical connection block seat is slidably engaged with an actuation link; one end of said actuation link away from said electrical connection block seat is fixedly connected to said electrical plug, and said electrical plug is connected to said electrical connection block seat via a conductive wire; spring I is fixedly mounted between one end of said actuation link away from said electrical plug and said electrical connection block seat.

5. The night light according to claim 4, characterized in that said bolt assembly component comprises a brake post slidably engaged with said props I, the middle section of said brake post is provided with an annular groove portion, and one end of said brake post near said props II is provided with a threading portion, wherein said threading portion is threadedly engaged with the port of said props II; a rotating member is provided between said annular groove portion and said props I, and an braking member is provided between said rotating member and said actuation link.

6. The night light according to claim 5, characterized in that said rotating member comprises a sleeve rod axially slidably engaged with the outer wall of said props I, said sleeve rod perpendicular to said props I; one end of said sleeve rod rotatably is socketed in said annular groove portion and the other end of said sleeve rod is threadedly engaged with a threaded column, wherein one end of said threaded column away from said assembly block II is rotatably engaged with the interior of said assembly block I.

7. The night light according to claim 6, characterized in that said braking member comprises a gear fixedly engaged with the outer surface of said threaded column, the outer side of said gear is mounted with a gear rack, one end of said gear rack near said actuation link is provided with an optical axis, and one end of said optical axis near said actuation link is fixedly mounted with a brake block; the outer surface of said actuation link is provided with several transverse grooves that are evenly spaced and arranged in a straight line; and one end of said brake block near said actuation link is fixedly mounted with several brake teeth engaged with said transverse grooves.

8. The night light according to claim 7, characterized in that said optical axis is slidably inserted into said gear rack, and one end of said optical axis away from said brake block is fixedly mounted with a slider slidably arranged inside said gear rack, and one end of said slider away from said optical axis is provided with spring II.

9. The night light according to claim 7, characterized in that one end face of said gear rack away from brake teeth is slidably mounted with a positioning rod, and both ends of said positioning rod are fixedly connected to said assembly block I.

10. The night light according to claim 6, characterized in that the width of said sleeve rod is smaller than the inner ring diameter of said props I.

11. The night light according to claim 7, characterized in that said gear and one end face of said gear rack away from said assembly block II are slidably engaged on the inner wall of said assembly block I.

12. The night light according to claim 4, characterized in that the outer wall of said actuation link is provided with at least one straight groove; and said electrical connection block seat is slidably engaged with said groove.

13. The night light according to claim 3, characterized in that one end face of said assembly block I away from said assembly block II is provided with several thermal vias.

14. The night light according to claim 4, characterized in that said actuation link and said electrical connection block seat are both made of hard insulating materials.

15. The night light according to claim 5, characterized in that one end of said brake post away from said threading portion is provided with a hexagonal socket.

16. The night light according to claim 2, characterized in that one end of said mosquito repellent lamp housing away from said electrical plug is fixedly mounted on a blank-off plate, the center of which is provided with a press plate for actuating said tact switch, and the outer wall of said mosquito repellent lamp housing is inserted with a photosensitive module, which is electrically welded to said PCB.

* * * * *